United States Patent [19]

Shaffer et al.

[11] Patent Number: 5,999,595
[45] Date of Patent: Dec. 7, 1999

[54] LOCATION-SPECIFIC METHOD AND SYSTEM FOR PROCESSING MESSAGE STORAGE

[75] Inventors: Shmuel Shaffer, Palo Alto; William J. Beyda, Cupertino, both of Calif.

[73] Assignee: Siemens Information and Communication Networks, Inc., Boca Raton, Fla.

[21] Appl. No.: 08/895,545

[22] Filed: Jul. 17, 1997

[51] Int. Cl.$^6$ .................................................. H04M 1/64
[52] U.S. Cl. .................................... 379/88.18; 379/88.22
[58] Field of Search .................... 379/67.1, 88.22, 379/88.25, 88.28, 333, 242, 269, 88.1, 88.13, 88.18, 93.01, 100.08, 219

[56] References Cited

U.S. PATENT DOCUMENTS

| | | | |
|---|---|---|---|
| 4,805,207 | 2/1989 | McNutt et al. | 379/88.25 |
| 4,930,153 | 5/1990 | Hagedorn | 379/233 |
| 5,163,082 | 11/1992 | Karnowski | 379/88.01 |
| 5,220,596 | 6/1993 | Patel | 379/93.24 |
| 5,394,460 | 2/1995 | Olson et al. | 379/88.18 |
| 5,509,061 | 4/1996 | Amereller et al. | 379/88.18 |
| 5,572,578 | 11/1996 | Lin et al. | 379/88.18 |
| 5,613,108 | 3/1997 | Morikawa | 707/200 |
| 5,623,538 | 4/1997 | Petty | 379/88.18 |
| 5,647,002 | 7/1997 | Brunson | 379/88.18 |
| 5,905,775 | 5/1999 | Polcyn | 379/88.18 |

*Primary Examiner*—Scott Weaver

[57] ABSTRACT

A method and system for processing user-level messages, such as voicemail messages, among messaging systems within a network includes enabling inter-system transmissions of identifications of the physical locations in memory space for the mailboxes in which the contents of the user-level messages are directed. Each mailbox in a particular system is uniquely associated with a user and with a physical location in memory space at the system. The physical locations of the mailboxes are identified to remote systems within the network, so that the user-level messages may be accompanied by system-level messages that identify the appropriate physical locations. Thus, a receiving system may determine the physical location of an intended mailbox without performing a database search. In the preferred embodiment, each system-level message also includes the mailbox number, so that the receiving station may verify the physical location by matching the identified mailbox number with the actual mailbox number. If the mailbox numbers do not match or if there is no identification of the physical location within the system-level message, the receiving system performs a search of the available mailboxes to determine the appropriate mailbox for storing the user-level message.

18 Claims, 5 Drawing Sheets

LOCATION-SPECIFIC METHOD AND SYSTEM FOR PROCESSING MESSAGE STORAGE

BACKGROUND OF THE INVENTION

The invention relates generally to the exchange of user-level messages among systems in a network of systems and more particularly to increasing the efficiency of message processing within the network.

DESCRIPTION OF THE RELATED ART

The most commonly used messaging system for storing messages for subsequent retrieval by individuals is the voicemail system connected to a telecommunications network. Other messaging systems that electronically store messages include facsimile and email messaging systems and multimedia systems that store messages that may be combinations of video, image, voice and data information.

Some messaging systems require a person to individually process messages, i.e., a system administrator (SA) routes the messages to the appropriate mailboxes. For example, in a voicemail system, a receptionist at a facility having a private branch exchange (PBX) may redirect an incoming call to a voicemail box of an individual who is not available. Requiring human intervention in order to store messages is an approach that is inefficient with respect to the use of personnel and carries a potential of creating call congestion at the switchboard of the system administrator.

Automated systems are available. Direct inward dialing (DID) telecommunication trunks permit a caller from outside a PBX to dial directly to an extension of a called party within the facility. Under specified conditions (e.g., after a set number of rings) a call may be rerouted to the voice mailbox of the called party without human intervention.

U.S. Pat. No. 4,930,153 to Hagedorn describes an interface that supports voicemail for a phone system that includes either DID lines or PBX-generated addresses for plain old telephone service (POTS) lines. For each incoming call, the interface monitors the communication between the central office and the PBX to record the called telephone extension. The interface also passively monitors the line for a request to send the call to peripheral equipment, such as a voicemail system. When the request is received, the interface assumes supervision of the call. The stored telephone extension is downloaded to the voicemail system and the call is redirected to record a message at the voicemail system. Thus, the message is recorded without human intervention.

Another automated messaging system is described in U.S. Pat. No. 5,613,108 to Morikawa. This system provides processing for electronic mail (email). Each email message includes an envelope part and a content part. The envelope part is a system-level message that contains control information, such as the user's mailbox address. The content part is the user-level message that is intended to be read by the addressed party.

U.S. Pat. No. 4,805,207 to McNutt et al. describes a message taking-and-receiving system for use with a PBX. The messages from calling parties are stored on a hard disk in the form of ASCII-coded characters, since text files require substantially less memory space than voice message files. If the called party retrieves messages via a telephone, the stored text messages are converted to voice signals using known text-to-speech parameter conversion processing and a speech generator.

Each of the above-described messaging systems includes mailboxes that are dedicated to particular users of the system. A mailbox may store the messages that are directed to the user of the dedicated mailbox, but typically the messages are stored at different physical locations and the mailbox is updated to include pointers to those physical locations. The same approach is utilized for storage of other types of messages, including facsimile messages and multimedia messages that are a combination of video, image, voice, facsimile, and/or text information. Typically, database management is used by such systems. The mailboxes are contained on a storage device, such as a hard disk. Each mailbox contains various fields that define a user profile. One field of a mailbox may include a prerecorded greeting to be presented to each calling party. The greeting is often variable at the discretion of the user, but the location of the field within the user profile and the location of the user profile within the database application remain fixed. Another field of a user profile may designate the maximum number of messages that can be recorded for a particular user. The number of fields and the purposes of the fields will vary among systems. An important field is the field that identifies the mailbox address. For example, a mailbox address of a voicemail system of a PBX having DID lines may be the last five digits of the telephone number of the line.

When the messaging system is accessed, the user profiles are searched to locate the profile having the field with the mailbox address of the particular user for whom a message is to be stored for later retrieval. Searches within a database having a large number of user profiles occupy system resources for a significant period of time. After the desired user profile has been located, the fields within the profile are accessed. In order to reduce access time, U.S. Pat. No. 5,220,596 to Patel, which is assigned to the assignee of the present invention, describes a method and apparatus for propagating profiles to remote systems. Profiles of a local messaging system are sent to remote messaging systems for reading into the databases of the remote systems. As a result, consistency among the databases is increased.

What is needed is a method and system for processing message storage in a manner that is efficient with respect to both mailbox searching time and system resource allocation.

SUMMARY OF THE INVENTION

A method of processing user-level messages among messaging systems within a network includes inter-system transmissions of identifications of the physical locations in memory space for the mailboxes to which the user-level messages are directed. Each mailbox in a particular system is uniquely associated with a physical location in memory space at the system. The memory space may be a region on a hard disk, but this is not critical. Each user of the particular system has a separate mailbox in which user-level messages intended for that user or memory space pointers to those user-level messages are to be stored.

The physical locations of the mailboxes are identified to remote systems within the network. In one embodiment, the exchange of data is implemented in the form of an index table of physical locations, such that receiving systems are aware of all of the physical locations relevant to message storage at the sending system. However, other implementations are contemplated, e.g., identifying the physical location of the relevant mailbox each time that a user-level message is transmitted to a previously unidentified mailbox.

For at least some of the user-level messages directed to mailboxes at remote destination systems, a system-level message is associated with the user-level message. The system-level message may be transparent to both the sender and the receiver of the user-level message, but is used to efficiently process the user-level message. The system-level message includes the identification of the physical location of the mailbox, thereby enabling the receiving system to determine the physical location without performing a database search.

In the preferred embodiment, the system-level message also includes an identification of the mailbox number, so that the receiving system may verify that the physical location is correct. The associated user-level message or a memory space pointer to the user-level message will be stored at the identified physical location only if there is a match between the mailbox number in the system-level message and the mailbox number at the user profile that is accessed when the physical location is accessed. If the match does not occur, the receiving system performs a standard search to locate the appropriate mailbox.

In one embodiment, the messaging system is a voicemail system that includes a lookup table having information indicative of relationships between specific messages (e.g., messages directed to specific users) and physical locations in memory space. Information indicative of the relationships is transmitted to other systems, enabling the remote systems to identify the physical location for storage of an incoming message. Upon receiving an incoming message, the system detects the identified physical location and stores the incoming message appropriately. If no identification is detected, the lookup table is utilized to determine the physical location. The method and system may be utilized in applications other than voicemail processing (e.g., message processing for video data, image data, facsimile data, text data, or a combination of voice, video, image, facsimile, and/or text data.)

DETAILED DESCRIPTION

Figure 1:
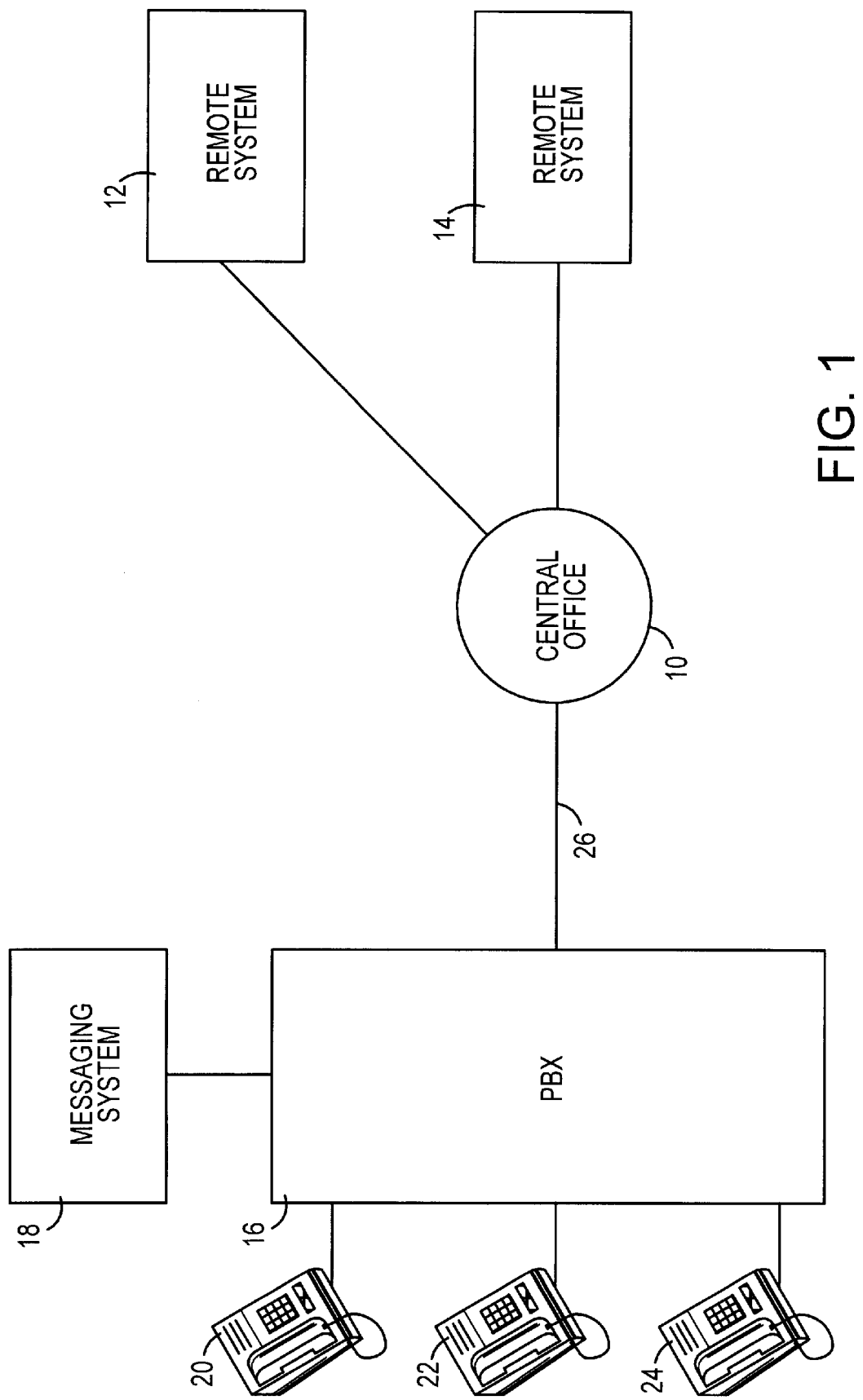
FIG. 1 is a block diagram of a network in which a central office connects remote systems to a PBX having a messaging system in accordance with the invention.

With reference to FIG. 1, a central office 10 of a telecommunications network is shown as connecting remote systems 12 and 14 to a public branch exchange (PBX) 16 having a messaging system 18. Each of the remote systems 12 and 14 includes messaging capability, so that the three systems 12, 14 and 18 may be used to store messages for later retrieval by users of the particular system. In one embodiment, the remote systems 12 and 14 are also PBXs that utilize the invention to be described below.

The PBX 16 is a conventional unit and is not critical to the invention. The PBX is shown as supporting three feature phones 20, 22 and 24. Conventionally, each of the phones is dedicated to a particular user of the PBX. For example, if the connection between the central office 10 and the PBX 16 includes direct inward dialing (DID) lines 26, each of the phones can be directly accessed from a remote telephone, not shown, by dialing a dedicated telephone number. Under defined conditions, a call that is originally directed to one of the phones 20–24 will be redirected to the messaging system 18. For example, if the called party at feature phone 20 is using the phone at the time of an incoming call, the second received call will be redirected to the messaging system 18 using techniques well known in the art. The calling party may then leave a message for later retrieval by the user of the system. Incoming calls may also be redirected to the messaging system 18 after a preselected number of rings at the phone 20.

While the messaging system 18 will be described primarily with respect to voicemail, the system and the process for utilizing the system may be used in other applications. For example, the processing may be used in electronic storage-and-retrieval systems for facsimiles, electronic mail, video mail, and multimedia messages that include combinations of data in the forms of voice, video, facsimile, image and textual data. For each of these systems, each user of the multi-user system is assigned a separate mailbox for recording messages intended for that user. The mailboxes have logical addresses and have physical addresses that define a physical location in memory space for storing incoming messages. The logical address in a PBX application is often the extension number of the feature phone 20, 22 and 24 that is dedicated to the user for whom a message is to be stored. The physical address is typically not identifiable by either the calling party or the called user. At the initiation of message storage, the prior art technique is to identify the logical mailbox address, enabling the messaging system to execute a search for the physical location in memory space for processing the storage of the incoming message. If a number of messages are delivered sequentially to the mailbox, the prior art technique requires that the search be conducted for each incoming message. However, utilizing the invention to be described below allows the incoming message to include the physical address as well as the logical address. This significantly reduces the time and the processing operations for a storage-and-retrieval system.

Figure 2:
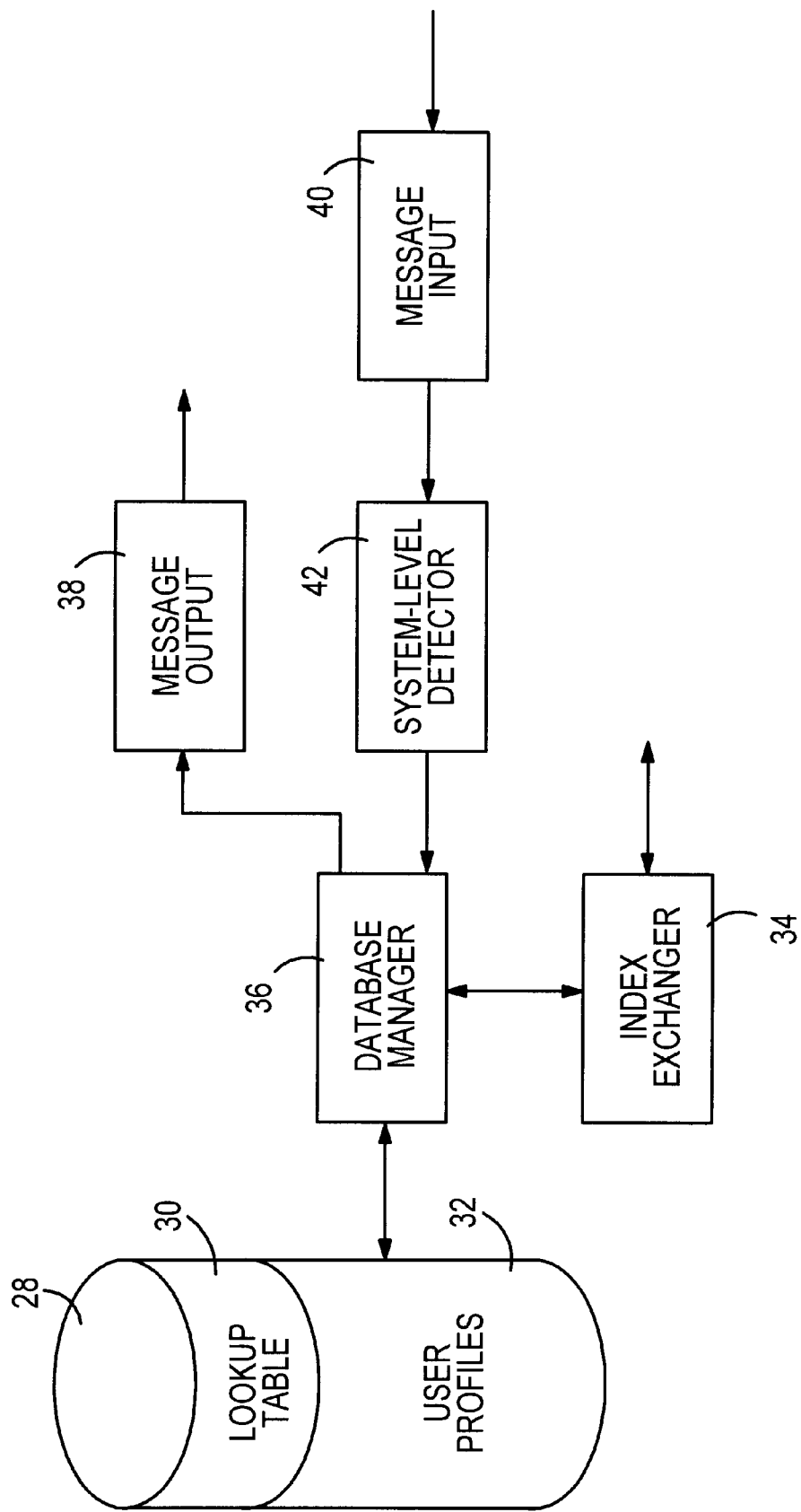
FIG. 2 is a block diagram of components of the messaging system of FIG. 1.

While the messaging system 18 is shown as being an adjunct device, this is not critical. The circuitry for a messaging system may be integrated into the PBX 16. One exemplary embodiment of the messaging system is shown in FIG. 2. The messaging system includes a storage device 28. The storage device is a conventional component. The device may be a hard disk or an array of hard disks, but other types of recording media may be utilized. The storage device 28 includes a first portion that is used for recording a lookup table 30 and a second portion that is used for recording user profiles 32. In the preferred embodiment, the storage device includes a third portion in which the incoming messages are stored, so that only a memory space pointer to the appropriate space within the third portion needs to be stored within the user's mailbox when a message is received and recorded. The lookup table identifies the association between the logical address of a user profile and the physical address of the user profile. Thus, an incoming message that identifies only the logical address requires a search to determine the physical address before the message can be stored at the appropriate user profile. On the other hand, if the incoming message identifies the physical address, such a search is not required.

The messaging system includes an index exchanger 34 that is used to transmit and receive information indicative of the physical locations of the user profiles within the storage device 28 and within storage devices of remote systems 12 and 14 of FIG. 1. As an example, the logical addresses and physical addresses of user profiles of the remote system 12 may be transmitted to the messaging system 18 and stored within the first portion of the storage device 28. Subsequently, the messages that are transmitted to the remote system 12 may include the physical location in memory space for the appropriate mailbox of the user of the remote system 12. Similarly, the physical addresses of the user profiles 32 of the local storage device 28 may be transmitted to the remote system 12, enabling the remote system to identify the physical location within a system-level message that is transmitted with any user-level message to be recorded at a mailbox of the local storage device 28.

A database manager 36 controls the flow of information to and from the storage device 28. For outgoing messages, a message output circuit 38 is utilized. While the message output circuit is shown as being connected to the database manager 36, this is not critical. If the physical locations in memory space of remote systems are stored at a device other than the storage device 28, the message output device may be isolated from the other components of the messaging system 18.

Message outputs comprise two components. The first component is the user-level message that is to be recorded at the remote system. The content of this component is the information that is intended to be conveyed to the user at the remote system. For example, in the voicemail application, the user-level message is the voicemail message. Of course, in a multimedia application, the user-level message includes at least one of voice, video, image, facsimile, and textual data. The second component is a system-level message. It is this second component that contains at least one of the logical address and the physical location of the mailbox in which the user-level message or memory space pointer is to be stored. The system-level message may be transmitted separately from the user-level message or may be a header to the user-level message. The implementation is not critical to the invention, and available techniques are known by persons skilled in the art.

Incoming messages are received at a message input circuit 40. The incoming message is passed to a system-level detector circuit 42 that is used to detect information relevant to processing the user-level component of an incoming message. For example, the detector circuit may extract a header from a user-level message to determine whether a physical location in memory space is identified within the header. If the header includes the identification of a physical memory location, the identification is passed to the database manager 36 for storing the user-level message within the appropriate mailbox without reference to the lookup table 30. As will be explained more fully below, the process preferably includes verifying that the physical location in memory space includes the correct mailbox. This verification is easily implemented by including the logical address with the physical address when the system-level message is generated for transmission with the user-level message. The verification can then take place by comparing the logical address within the system-level message with the logical address within the user profile 32 that is found at the identified physical address. The same process occurs if the system-level message is transmitted prior to the user-level message, rather than as a header to the user-level message.

Figure 3:
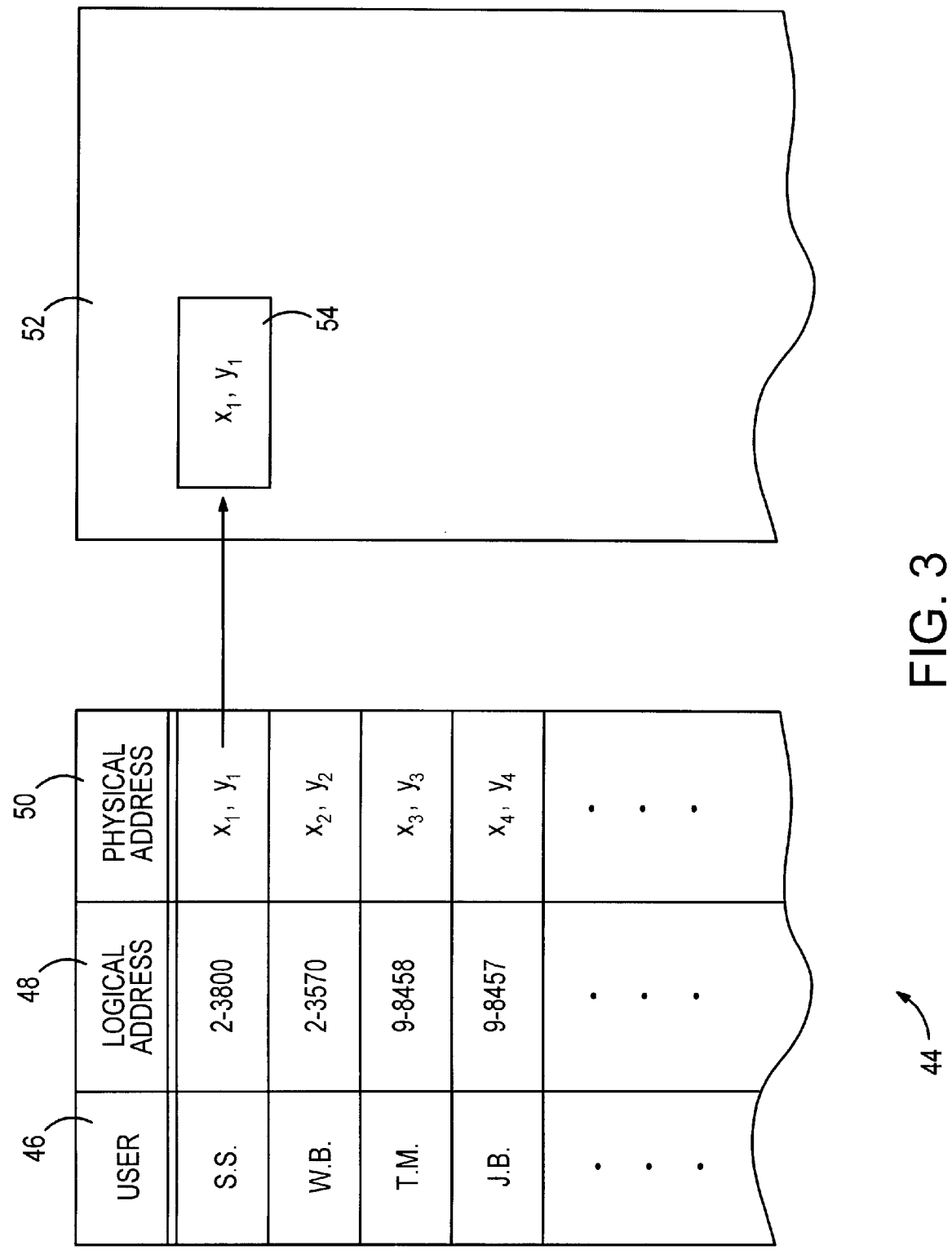
FIG. 3 is a schematical representation of the data stored on the storage device of FIG. 2.

Referring now to FIG. 3, an exemplary lookup table 44 is illustrated. The lookup table is shown as including three columns 46, 48 and 50. The first column 46 identifies the users of a particular messaging system. This column is not critical to implementation of the messaging system or the present invention. The second column 48 identifies the logical addresses of user profiles. In a voicemail system, the logical addresses may be the last five digits of the telephone number of the user. Other types of messaging systems may use other criteria for determining the logical address. The third column 50 is the physical address of the mailbox of the user. The physical address may be identified in X,Y coordinates. Alternatively, the physical address may be an identification of the track or a disk segment if the storage device 28 is a hard disk or array of hard disks. In FIG. 3, the memory space 52 is represented by a rectangular region, but the memory space is more likely to be disk-shaped.

The physical location associated with the logical mailbox address "2-3800" is $x_1$, $y_1$. This is a pointer to the segment 54 in memory space 52. This segment in memory space contains the user profile of user "S.S." As is well known in the art, the user profile may include a greeting that is to be presented to a person, if the messaging system is a voicemail system. The segment 54 also includes space for recording a list of memory space pointers to locations on the storage device at which incoming user-level messages have been stored for later retrieval by the user.

The use of the lookup table 44 is known in the art for identifying physical locations in memory space within the system having the lookup table. However, utilizing the invention, the lookup table 44 may identify physical addresses in memory space 52 at a remote system, so that system-level messages that identify the appropriate remote physical location may be transmitted with a user-level message that is to be stored. For example, the index exchanger 34 in FIG. 2 may transmit the lookup table 44 to each of the remote systems 12 and 14 in FIG. 1. Thus, a user at one of the remote systems may initiate a user-level message that includes a system-level message which identifies the logical mailbox address and the physical location of the memory segment 54 in memory space 52 at the storage device 28 in FIG. 2. This procedure may be better understood by referring to the process steps of FIGS. 4, 5 and 6.

Figure 4:
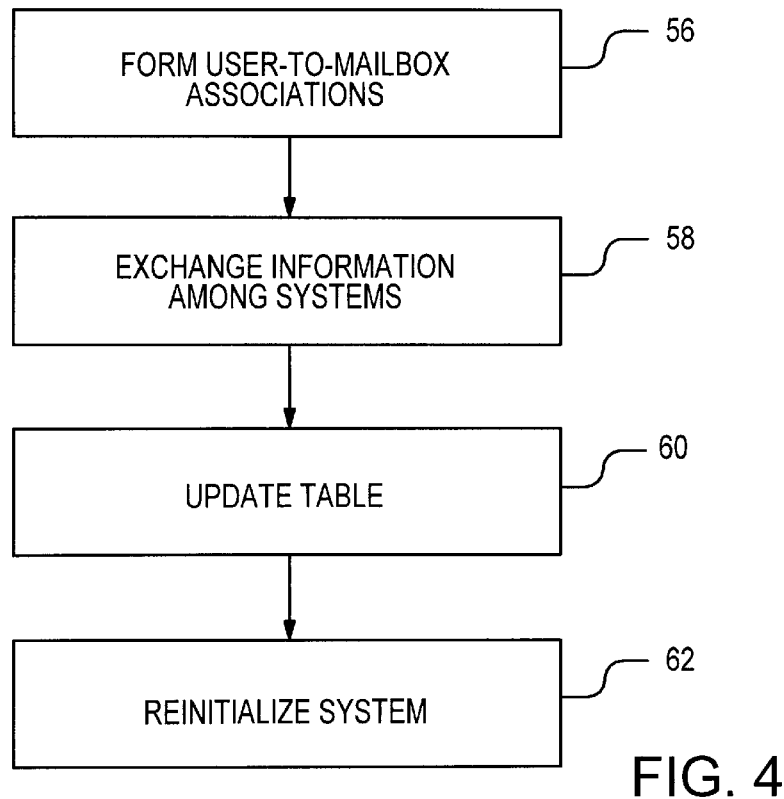
FIG. 4 is a process flow of steps for initializing the messaging system of FIGS. 1 and 2.

The initialization process of FIG. 4 includes a step 56 of forming user-to-mailbox associations. As noted in U.S. Pat. No. 5,220,596 to Patel, which is assigned to the assignee of the present invention, this step may be implemented by a system administrator (SA) by adding a user profile in memory space for each user of a system. The user profile of a voicemail system typically includes a greeting. The greeting may be updated periodically, but the physical location of the user profile typically does not change. Referring again to FIG. 3, the lookup table 44 may be formed at step 56 to identify the logical addresses 48 and the physical addresses 50 of user profiles stored at the memory space 52 of the local storage device.

In step 58 of FIG. 4, information is exchanged among systems within a network. This exchange of information may be completely isolated from the exchange of user-level messages. For example, the table 44 of FIG. 3 may be transmitted from the local messaging system 18 of FIG. 1 to the two remote systems 12 and 14. As a consequence of step 58, each of the three systems will include the lookup table 44. In an alternative embodiment, the exchange of information at step 58 is connected to transmission of a user-level message. For example, if a voicemail message is to be sent from the remote system 12 to a voice mailbox of messaging system 18, the remote system 12 may search to determine whether the physical location in memory space of the appropriate mailbox is known at the remote system. If the physical location is not known, the remote system may request a lookup from the messaging system 18 to determine the physical location. This physical location that is exchanged at step 58 is then stored in an index. A protocol element may be sent to any intervening nodes, so that the new index location is identified. That index may then be placed in a system-level message before transmission of the user-level message. In this embodiment, the relationships between mailboxes and physical locations in memory space become known to remote systems on a user-by-user basis.

In step 60 of FIG. 4, the physical locations in memory space at remote systems are used to update tables as the information arrives in step 58. The table that is updated may be an extension of the lookup table 44 in FIG. 3, so that physical locations for the local memory space and the remote memory space may be found in a single table. In a preferred embodiment, the table is an indexing table specific to remote systems. By isolating the remote information from the local information, there is a reduction in the search time for determining the appropriate physical location for an incoming user-level message that does not include the identification of the physical location. In step 62 of FIG. 4, the messaging system is reinitialized.

Figure 5:
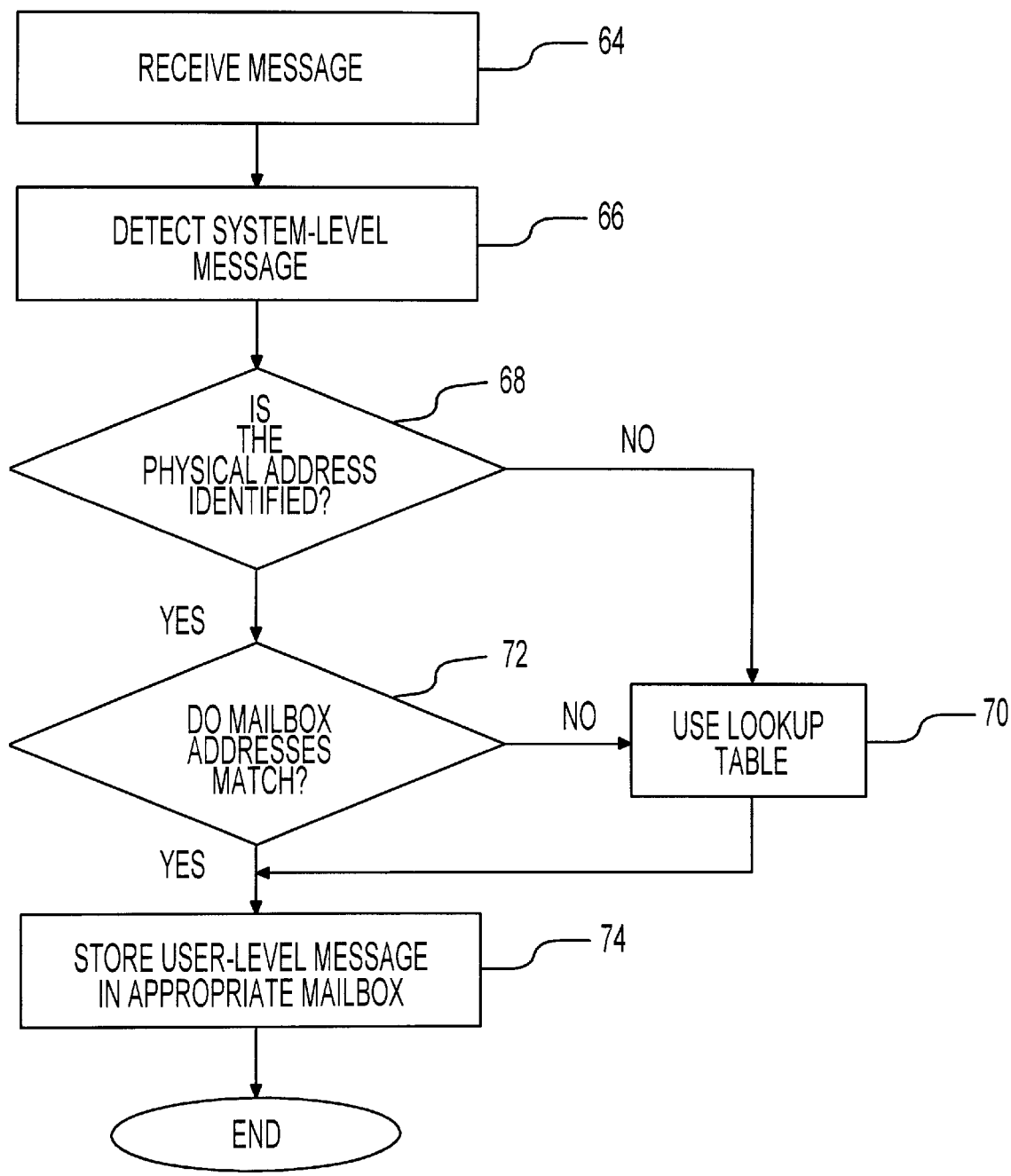
FIG. 5 is a process flow of steps for processing an incoming message to the messaging system of FIGS. 1 and 2.

Referring now to FIG. 5, the steps for processing an incoming user-level message are illustrated. In step 64, the incoming message is received using the message input circuitry 40 of FIG. 2. This step is well known in the art. In step 66, the system-level message is detected. As noted above, the system-level message may be a header having an index that identifies the physical location in which the incoming user-level message or its memory space locator is to be stored. In a preferred embodiment, the system-level message includes both the physical location and the logical address of the mailbox.

In some embodiments, not all of the incoming system-level messages include the physical location in memory space for the mailbox that is relevant to storage of the user-level message. In the determination step 68, the receiving system determines whether the physical address is identified. If the physical address is not available from the system-level message, the conventional technique of utilizing a lookup table 70 is employed to identify the appropriate physical location of the mailbox in which the user-level message or memory space pointer is to be stored. On the other hand, if at determination step 68 the physical address is determined, the process preferably includes a step 72 of verifying the location. The verification step may be one in which the logical address contained within the system-level message is compared to the logical address identified in the user profile that is recorded at the physical location identified in the system-level message. It is possible that the configuration of mailboxes within memory space has been varied since the last update of an index table at the remote message-transmitting system. If the logical address of the mailbox that is recorded at the identified physical location does not match the anticipated logical address, the step 70 of utilizing the lookup table is employed. Alternatively, if the two mailbox addresses match, the user-level message is stored on the storage device and the appropriate memory space pointer is recorded in the designated mailbox at step 74. Similarly, if the lookup table is utilized at step 70 to determine the appropriate mailbox location, the message is stored at step 74. The process then ends at step 76.

Returning to step 72, a determination that the identified mailbox address does not match the mailbox address that is found at the physical location identified in the system-level message preferably results in a transmission to the remote system that originated the user-level message. This results in an exchange of information among systems, as shown at step 58 in FIG. 4. The correct index information is transmitted to the remote system, so that the remote system may update its table at step 60. The index information may be related to only the single incorrect mailbox address, or a complete index table may be transmitted to the remote site.

Figure 6:
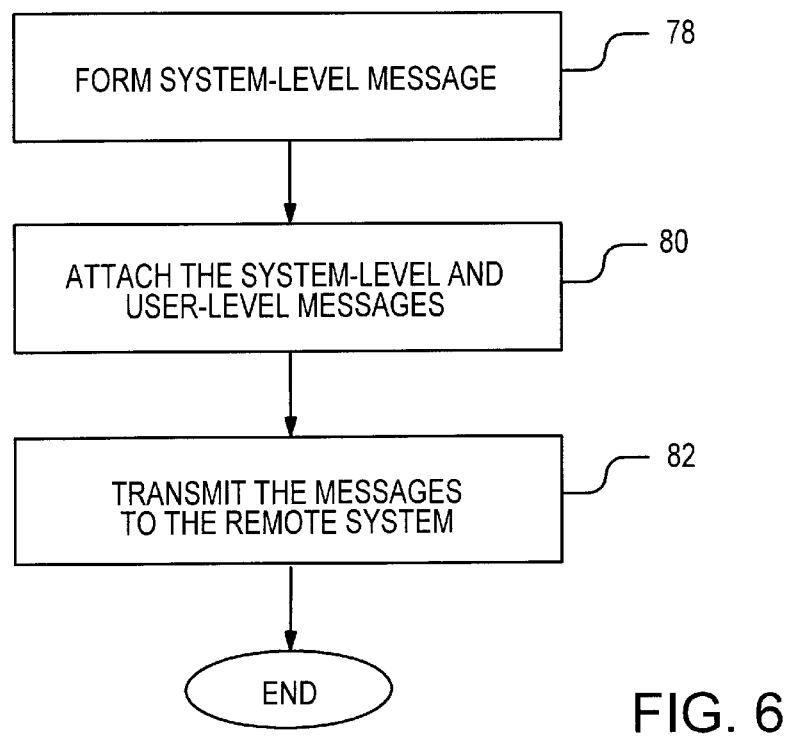
FIG. 6 is a process flow of steps for processing an outgoing message from the messaging system of FIGS. 1 and 2.

Referring now to FIG. 6, the process flow for an outgoing message is shown. In step 78, a system-level message is generated. If the physical address in memory space at the remote receiving system is unknown, the sending system may transmit a preliminary request for such information. Preferably, the system-level message includes both the physical address and the logical address of the message at the remote system. The system-level message also includes conventional information to such messages. At step 80, the system-level message is attached to the user-level message. As previously noted, the system-level message may be transmitted prior to the user-level message, or may be a header for the user-level message. At step 82, the messages are transmitted to the remote system.

While the invention has been described primarily with respect to voicemail messaging systems, this is not critical. The method and system may be used in other electronic storage-and-retrieval applications, including facsimiles, electronic mail, video mail, and multimedia messages that include combinations of data in the forms of voice, video, facsimile, image, and text. Moreover, it is not critical that the invention be used in a telecommunications network. The method and system may be applied to other networks of nodes that utilize a distributed database.

What is claimed is:

1. A method of processing user-level messages among remote systems of a network of systems comprising steps of:
   at each system, associating a physical location in memory space with each user of said system such that a mailbox is formed at said associated physical location for information relating to storing user-level messages intended for said each user;
   exchanging data among said systems such that said physical locations of said mailboxes in memory space are identified to remote systems of said network; and
   for at least some of said user-level messages directed to mailboxes at remote destination systems and on a message-by-message basis, transmitting a system-level message associated with each user-level message such that said system-level message includes an identification of the physical location of the mailbox to which said each user-level message is directed, thereby enabling a remote destination system to determine said physical location from said system-level message.

2. The method of claim 1 wherein said step of transmitting a system-level message includes identifying a mailbox number indicative of said mailbox to which said each user-level message is directed, thereby generating said system-level message to include both said mailbox number and said identification of said physical location of said mailbox.

3. The method of claim 2 further comprising a step of verifying at said remote destination system receiving said system-level message that said mailbox number identified in said system-level message has a correspondence with a mailbox number of a mailbox encountered at said physical location.

4. The method of claim 3 further comprising steps of storing said each user-level message in memory at said remote destination system and forming a memory space pointer within said encountered mailbox to identify said stored user-level message when said step of verifying confirms said correspondence.

5. The method of claim 3 further comprising a step of utilizing a lookup table to determine a corrected physical location of said mailbox number identified in said system-level message when said step of verifying indicates a lack of said correspondence, said corrected physical location thereby being used as an identification of an appropriate mailbox to which said each user-level message is to be directed.

6. The method of claim 1 wherein said step of associating said physical location in memory space is a step of identifying memory locations on a storage device of a voicemail system.

7. The method of claim 1 wherein said step of transmitting said system-level message is a step of attaching a header to a transmission of said user-level message.

8. The method of claim 1 wherein said step of exchanging data includes transmitting an index table of physical locations from a first system in said network to a second system, said index table including identifications of all physical locations associated with users of said first system.

9. The method of claim 1 wherein said step of exchanging data is a step that is responsive to receiving a first user-level message for which there is no system-level message having an identification of the physical location of the mailbox to which said first user-level message is directed, said data thereby being accessible for system-level messages of subsequent user-level messages.

10. A method of accessing a database of a messaging system comprising steps of:

forming a lookup table that includes information indicative of relationships between specific messages and physical locations of a memory device on which said specific messages are to be stored;

transmitting from said messaging system said information indicative of said relationships such that said information may be associated with incoming messages, thereby identifying the physical arrangement of data within said memory device;

upon receiving an incoming message, detecting whether there is an identification of a physical location to which said incoming message is directed for storage on said memory device;

if said identification is detected, storing said incoming message on said memory device such that either said incoming message or a memory space pointer is recorded at said physical location; and if said identification is not detected, utilizing said lookup table to determine said physical location to which said incoming message is directed.

11. The method of claim 10 wherein said step of forming said lookup table includes forming a one-to-one correspondence between said physical locations and users of said messaging system such that said specific messages are specific with respect to said users.

12. The method of claim 11 wherein said step of forming said lookup table establishes a lookup table of a voicemail messaging system.

13. The method of claim 10 further comprising a step of verifying accuracy of said identification of said physical location prior to said step of storing said incoming message.

14. The method of claim 10 wherein said step of detecting whether there is an identification of a physical location includes receiving a system-level message directly associated with said incoming message, said system-level message being one of a header attached to said incoming message or an isolated message that precedes said incoming message.

15. A messaging system for processing user-level messages comprising:

a memory device having local memory space that is partitioned to uniquely associate physical locations in said local memory space with mailboxes of users of said messaging system;

indexing means for exchanging system data with remote messaging systems, said system data including outgoing memory-partitioning data specific to said physical locations in local memory space and including incoming memory-partitioning data specific to physical locations in remote memory space;

output means for forming and transmitting outgoing system-level messages uniquely associated with outgoing user-level messages to users of said remote messaging systems, at least some of said outgoing system-level messages to said users including indicators of physical locations in remote memory space for locating appropriate mailboxes to which said associated outgoing user-level messages are directed; and input means for receiving and reading incoming system-level messages uniquely associated with incoming user-level messages, at least some of said incoming system-level messages having indicators of said physical locations in local memory space for locating appropriate mailboxes to which said associated incoming user-level messages are directed.

16. The messaging system of claim 15 wherein said memory device is a component of a voicemail messaging unit.

17. The messaging system of claim 15 wherein said input means and said output means manage headers transmitted with said incoming and outgoing user-level messages, said headers being said incoming and outgoing system-level messages.

18. The messaging system of claim 15 wherein said indexing means is automatically initiated to exchange said system data.

* * * * *